(12) United States Patent
Mueller et al.

(10) Patent No.: US 8,124,560 B2
(45) Date of Patent: Feb. 28, 2012

(54) MICROPOROUS TECTOSILICATE AND METHOD FOR THE PRODUCTION THEREOF

(75) Inventors: Ulrich Mueller, Neustadt (DE); Gerald Lippert, Lampertheim (DE); James Reuben Brown, Mannheim (DE); Hermann Gies, Sprockhoevel (DE); Bernd Marler, Gevelsberg (DE); Nadine Stroeter, Bochum (DE); Yingxia Wang, Beijing (CN)

(73) Assignees: BASF Aktiengesellschaft, Ludwigshafen (DE); rubitec GmbH, Bochum (DE)

( * ) Notice: Subject to any disclaimer, the term of this patent is extended or adjusted under 35 U.S.C. 154(b) by 0 days.

(21) Appl. No.: 12/899,572

(22) Filed: Oct. 7, 2010

(65) Prior Publication Data
US 2011/0135567 A1  Jun. 9, 2011

Related U.S. Application Data

(63) Continuation of application No. 11/578,286, filed as application No. PCT/EP2005/003891 on Apr. 13, 2005, now abandoned.

(30) Foreign Application Priority Data

Apr. 13, 2004  (DE) .......................... 10 2004 017 915

(51) Int. Cl.
*B01D 53/02* (2006.01)

(52) U.S. Cl. ........................... 502/407; 96/108; 423/718

(58) Field of Classification Search .................... 95/143; 96/108; 423/326–327; 264/239; 502/60
See application file for complete search history.

(56) References Cited

U.S. PATENT DOCUMENTS

| | | | |
|---|---|---|---|
| 4,495,303 A | 1/1985 | Kuehl | |
| 4,552,739 A | 11/1985 | Kuhl | |
| 5,283,043 A | 2/1994 | Johnson et al. | |
| 5,393,511 A | 2/1995 | Delprato et al. | |
| 5,463,160 A | 10/1995 | Kuhlmann et al. | |
| 6,380,119 B1 | 4/2002 | Grosch et al. | |
| 6,752,980 B1 | 6/2004 | Moscoso et al. | |
| 6,756,030 B1 | 6/2004 | Rohde et al. | |
| 2003/0144405 A1 | 7/2003 | Lewin et al. | |

FOREIGN PATENT DOCUMENTS

| | | |
|---|---|---|
| DE | 197 23 949 | 12/1998 |
| EP | 0 063 436 A1 | 10/1982 |
| JP | 01-057048 | 12/1989 |
| WO | 98/55228 | 12/1998 |
| WO | 03/068679 | 8/2003 |

OTHER PUBLICATIONS

Ullmann's Encyclopedia of Industrial Chemistry, 4th ed., vol. 2, p. 295 et. seq. (1972).
D.W. Breck, Zeolite Molecular Sieves, J. Wiley, pp. 634-641 (1974).
Y. Wang, et al., "The substitution germanium for silicon in AST-type zeolite", Solid State Science, vol. 5, pp. 1412-1433 (2003).
Y.X. Wang, et al., "Synthesis and Crystal Structure of Zeolite RUB-41 Obtained as Calcination Product of a Layered Precursor: a Systematic Approach to a New Synthesis Route", Chemistry of Materials, vol. 17, pp. 43-49 (2005).

*Primary Examiner* — Duane Smith
*Assistant Examiner* — Karla Hawkins
(74) *Attorney, Agent, or Firm* — Oblon, Spivak, McClelland, Maier & Neustadt, L.L.P.

(57) ABSTRACT

The present invention relates to a tectosilicate having an X-ray diffraction pattern in which at least the following reflections occur:

| Intensity (%) | Diffraction angle 2θ/° [Cu K(alpha 1)] |
|---|---|
| 100 | 9.8-10.2 |
| 24-34 | 11.0-11.4 |
| 9-19 | 15.5-15.9 |
| 12-22 | 19.4-19.6 |
| 19-29 | 19.6-19.8 |

100% relating to the intensity of the maximum peak in the X-ray diffraction pattern.

14 Claims, 13 Drawing Sheets

MICROPOROUS TECTOSILICATE AND METHOD FOR THE PRODUCTION THEREOF

This is a continuation application of U.S. application Ser. No. 11/578,286, filed Oct. 13, 2006, which is a 371 of PCT/EP05/03891 filed on Apr. 13, 2005.

DESCRIPTION

The present invention relates to a process for the preparation of silicates, in particular for the preparation of tectosilicates having a zeolite structure. The present invention also relates to the silicates obtainable by this process, in particular layered silicates and tectosilicates. The present invention furthermore relates to these silicates per se and the use thereof, in particular the use thereof as molecular sieves for separating and/or isolating mixtures, in particular for separating alkane and/or alkene gas mixtures.

In chemical production or purification processes, the object of separating off at least one substance from a mixture or quite generally of separating mixtures frequently arises. In principle, this separation can be performed by distillative methods. However, particularly in the case of mixtures having a very narrow boiling range, these distillative methods cannot be carried out economically or can be carried out economically only with the use of auxiliary agents. An example of the separation of mixtures having a narrow boiling range is the separation of alkanes or alkenes, for example the separation of isomeric alkanes or alkenes.

It is an object of the present invention to provide compounds which can be used as molecular sieves and/or adsorbents for such isolations and/or separations.

It is a further object of the present invention to provide a process for the preparation of these compounds.

It is a further object of the present invention to provide novel silicates, in particular zeolites, which can advantageously be used firstly for the applications described above but also for any other conceivable purpose, for example as catalysts or in other technical areas.

Therefore, the present invention relates to a process for the preparation of a silicate containing at least silicon and oxygen, comprising (1) mixing of silica and/or of a silica precursor with an aqueous solution comprising at least one $R_1R_2R_3R_4N^+$-comprising tetraalkylammonium compound and at least one base, (2) heating of the colloidal solution obtained according to (1) to a temperature in the range of from greater than the boiling point of the colloidal solution under the chosen pressure to 180° C. at atmospheric pressure to give a suspension containing at least one silicate, wherein $R_1$, $R_2$, $R_3$ and $R_4$, independently of one another, are selected from the group consisting of methyl, ethyl, n-propyl and isopropyl, preferably of methyl, ethyl and n-propyl, wherein at least two of the residues $R_1$, $R_2$, $R_3$ and $R_4$ are different from one another.

Preferably used $R_1R_2R_3R_4N^+$-comprising tetraalkylammonium compounds are compounds in which at least one residue is methyl. Compounds in which two or three residues are methyl are more preferred, and compounds in which two residues are methyl are particularly preferred.

According to a further, preferred embodiment, two residues are methyl while the other two residues are ethyl or n-propyl or isopropyl. According to a particularly preferred embodiment, two residues are methyl and the other two residues are either ethyl or n-propyl.

Accordingly, the present invention also relates to a process as described above, wherein $R_1$ and $R_2$ are methyl and both $R_3$ and $R_4$ are either ethyl or n-propyl or isopropyl, preferably ethyl or n-propyl.

According to the invention, in addition to the at least one $R_1R_2R_3R_4N^+$-comprising tetraalkylammonium compound, a base differing from this compound may be used. Examples of this base are ammonium hydroxide $NH_4OH$, alkali metal hydroxides or alkaline earth metal hydroxides, such as sodium hydroxide or potassium hydroxide, or mixtures of two or more of these compounds. In this case, the at least one $R_1R_2R_3R_4N^+$-comprising tetraalkylammonium compound contains one or more suitable anions, for example halogen anions, such as fluoride or chloride or bromide or iodide.

According to a preferred embodiment, the at least one $R_1R_2R_3R_4N^+$-comprising tetraalkylammonium compound also contains the base used according to (1) as an anion. Examples of basic anions in this context include, inter alia, the hydroxide ion or aluminates. A particularly preferred basic anion is the hydroxide ion.

The present invention accordingly also relates to a process as described above, wherein the at least one $R_1R_2R_3R_4N^+$-comprising tetraalkylammonium compound contains a basic anion, preferably a hydroxide ion.

The present invention therefore also relates to a process as described above, wherein the aqueous solution used according to (1) contains dimethyldipropylammonium hydroxide (DMDPAH) and/or dimethyldiethylammonium hydroxide (DMDEAH).

The molar ratios of silica, tetraalkylammonium compound, in particular tetraalkylammonium hydroxide compound, and water, can be adjusted substantially as desired, provided that it is ensured that, according to (2), at least one silicate is obtained by crystallization.

According to a preferred embodiment, the amounts of silica and/or precursor thereof, tetraalkylammonium hydroxide compound and water used are chosen so that the colloidal solution obtained according to (1) contains silica, tetraalkylammonium hydroxide compound and water in weight ratios in the range of 1:(0.45-0.55):(8-12). Furthermore, with regard to the above-mentioned ranges, water contents up to 15 are possible, 3 being mentioned by way of example as the lower limit. Accordingly, the colloidal solution obtained according to (1) may contain silica, tetraalkylammonium hydroxide compound and water in weight ratios in the range of 1:(0.45-0.55):(3-15). According to the invention, the water content may furthermore be in the range of from 4 to 15 or from 5 to 15 or from 6 to 15 or from 7 to 15 or from 8 to 15 or from 9 to 15 or from 10 to 15 or from 11 to 15 or from 12 to 15 or from 13 to 15 or from 14 to 15 or from 3 to 14 or from 3 to 13 or from 3 to 12 or from 3 to 11 or from 3 to 10 or from 3 to 9 or from 3 to 8 or from 3 to 7 or from 3 to 6 or from 3 to 5 or from 3 to 4. More preferred ranges are, for example, from 4 to 14.5 or from 5 to 14 or from 6 to 13.5 or from 7 to 13 or from 7.5 to 12.5.

For the preferred tetraalkylammonium hydroxide compounds, the present invention accordingly also relates to a process as described above, wherein the colloidal solution obtained according to (1) contains $SiO_2$, DMDPAH and/or DMDEAH and water in the weight ratios $SiO_2$:(DMDPAH and/or DMDEAH):water of 1:(0.45-0.55):(8-12), more preferably of 1:(0.46-0.54):(8-12), more preferably of 1:(0.47-0.53):(8-12), more preferably of 1:(0.48-0.52):(8-12) and particularly preferably of 1:(0.49-0.51):(8-12). The water content in each case is more preferably from 8 to 11 or from 8 to 10 or from 8 to 9 or from 9 to 12 or from 9 to 11 or from 9 to 10 or from 10 to 12 or from 10 to 11 or from 11 to 12.

The present invention therefore also relates to the use of an $R_1R_2R_3R_4N^+$-comprising tetraalkylammonium compound, in particular of dimethyldipropylammonium hydroxide and/or dimethyldiethylammonium hydroxide, preferably as a structure directing agent, in the synthesis of a silicate, preferably the hydrothermal synthesis of a silicate, the silicate more preferably being a layered silicate or tectosilicate and the tectosilicate more preferably being a silicate of the zeolite type.

In principle, it is possible to heat the colloidal solution obtained according to (1) under any suitable pressure at any suitable temperature, according to (2), provided that it is ensured that at least one silicate crystallizes in the colloidal solution. Preferred temperatures here are those which are above the boiling point of the solution obtained according to (1) at the chosen pressure. Temperatures up to 180° C. at normal pressure are more preferred. According to a particularly preferred embodiment of the process of the present invention, the crystallization according to (2) is carried out under normal pressure, whereas in most hydrothermal processes of the prior art the crystallization is carried out under a pressure elevated with regard to normal pressure.

The present invention accordingly also relates to processes as described above, wherein the hydrothermal crystallization in (2) is carried out at normal pressure.

The term "normal pressure" as used in the context of the present invention relates to a pressure of 101,325 Pa in the ideal case. However, this pressure may vary within boundaries known to the person skilled in the art. By way of example, this pressure can be in the range of from 95,000 to 106,000 or of from 96,000 to 105,000 or of from 97,000 to 104,000 or of from 98,000 to 103,000 or of from 99,000 to 102,000 Pa.

The temperature used according to (2) at normal pressure is preferably in the range of from 100 to 180° C., more preferably in the range of from 110 to 175° C., more preferably in the range of from 120 to 170° C., more preferably in the range of from 130 to 165° C., and particularly preferably in the range of from 140 to 160° C.

The present invention accordingly also relates to a process as described above, wherein the colloidal solution obtained according to (1) is heated at normal pressure to a temperature of in the range of from 100 to 180° C., according to (2).

This temperature to which the colloidal solution obtained according to (1) is heated according to (2) can in principle be maintained until the crystallization has taken place to the desired extent. Here, periods in the range of up to 45 days are preferred, preferably from 12 hours to 45 days, more preferably from 12 hours to 30 days, more preferably from 1 to 30 days, for example about 1, 2, 5, 10, 15, 20, or 30 days.

The present invention accordingly also relates to a process as described above, wherein the colloidal solution obtained according to (1) is heated according to (2) for a period in the range of from 12 hours to 30 days.

Periods in a range of up to 12 h such as 0.5 to 12 h are also conceivable in the context of the process according to the present invention.

Any suitable compound can in principle be employed as silica or a precursor thereof. For example, tetraalkoxysilanes, such as tetraethoxysilane or tetrapropoxysilane, may be mentioned as precursor compound. In the process of the present invention, silica as such is particularly preferably employed rather than a silica precursor. Amorphous silica is in turn preferred.

The present invention accordingly also relates to a process as described above, wherein amorphous silica is employed according to (1).

Here, it is in principle possible to employ any suitable amorphous silica. Amorphous silica having a specific surface (BET, Brunauer-Emmet-Teller; determined according to DIN 66131 by nitrogen adsorption at 77 K) in the range of from 10 to 400, preferably in the range of from 10 to 100, and particularly preferably in the range of from 10 to 50, $m^2/g$ is preferred. Further preferred ranges are from 50 to 100 $m^2/g$ or from 100 to 300 $m^2/g$ or from 300 to 400 $m^2/g$.

According to (1), very particularly preferably DMDPAH and/or DMDEAH are employed in addition to silica.

These compounds can be prepared by any conceivable process. According to a preferred embodiment of the process of the present invention, DMDEAH or DMDPAH is obtained by reaction of dipropylamine or diethylamine and methyl iodide and subsequent anion exchange.

According to a more preferred embodiment, dipropylamine or diethylamine and methyl iodide are reacted with one another in a suitable solvent or solvent mixture, preferably in ethanol. The temperature at which this reaction is carried out is preferably in the range of from 20 to 75° C., more preferably in the range of from 30 to 60° C., and particularly preferably in the range of from 40 to 50° C.

According to a further embodiment of the process of the present invention, DMDEAH or DMDPAH can be prepared starting from dimethylamine and ethyl bromide or propyl bromide in a suitable solvent, for example preferably ethanol, at a suitable temperature, for example preferably from 40 to 50° C.

The anion exchange according to the present invention is preferably effected after separation such as by filtration, centrifugation or another solid-liquid separation process, for example preferably by filtration, and washing of the respective ammonium hydroxide, for example preferably with a suitable alcohol, such as ethanol, by means of a suitable ion exchange resin, for example an Amberlyst™ resin or a resin of the type AG1-X8 (BioRad). Ion exchange using $Ag_2O$ is also possible.

DMDEAH and/or DMDPAH are used in (1) preferably as a solution, particularly preferably as an aqueous solution, the concentration of the aqueous solution with respect to DMDEAH and/or DMDPAH preferably being from 0.4 to 1 mol/l.

According to a particularly preferred embodiment of the process of the present invention, DMDPAH is employed according to (1).

The temperature during the preparation of the colloidal solution according to (1) is preferably in the range of from 10 to 40° C., more preferably in the range of from 15 to 35° C., and particularly preferably in the range of from 20 to 30° C.

In the context of the process of the present invention, it is possible to prepare the colloidal solution according to (1) in one step by mixing amorphous silica and tetraalkylammonium hydroxide solution.

According to a preferred embodiment of the process of the present invention, a colloidal solution which contains tetraalkylammonium hydroxide, silica and water in a weight ratio of $SiO_2$:tetraalkylammonium hydroxide:water of preferably 1:(0.45-0.55):(3-15), more preferably of 1:(0.47-0.53):(3-15), and particularly preferably of 1:(0.49-0.51):(3-15), is initially prepared in a first step. In at least one second step, the water content of the solution obtained in the first step is then adjusted by means of a suitable method so that it is in the above-mentioned preferred limits.

As a suitable method preferred inter alia, the water content is adjusted by removing water in at least one suitable apparatus. The water is removed preferably at a temperature in the range of from 60 to 85° C., more preferably of from 65 to 80° C., and particularly preferably of from 65 to 75° C.

The present invention accordingly also relates to the process as described above, wherein, according to (1),
(i) a colloidal solution which contains tetraalkylammonium hydroxide, silica and water in a weight ratio of SiO$_2$:tetraalkylammonium hydroxide:water of preferably 1:(0.45-0.55):(3-15) is prepared and
(ii) the water content of the colloidal solution obtained according to (i) is adjusted so that a colloidal solution which contains tetraalkylammonium hydroxide, silica and water in a weight ratio of SiO$_2$:tetraalkylammonium hydroxide:water of preferably 1:(0.45-0.55):(8-12) is obtained.

Rotary evaporators or ovens may be mentioned, inter alia, as at least one suitable apparatus. An oven is particularly preferred. Inter alia, apparatuses which permit removal of water at reduced pressure and hence at low temperatures are preferred in this context.

The heating and the subsequent preparation of the at least one silicate can be carried out in any suitable apparatus. For example, (2) is effected in an autoclave.

The colloidal solution is preferably suitably stirred for the crystallization according to (2). It is also possible to rotate the reaction vessel in which the crystallization is carried out.

According to an embodiment of the process of the present invention, the at least one silicate is separated off in a suitable manner in at least one step from the suspension obtained from (2). This separation can be effected, for example, by means of filtration, ultrafiltration, diafiltration or centrifuging methods or, for example, spray drying and spray granulation methods. Separation by means of spray drying or filtration is preferred.

Accordingly, the present invention also relates a process as described above, additionally comprising
(3) separation of the at least one silicate from the suspension obtained according to (2).

According to an embodiment of the process of the present invention, the crystallization according to (2) can be stopped by suitable quenching. Here, it is particularly preferred to add water to the suspension, said water being at a temperature which is suitable for stopping the crystallization.

According to a preferred embodiment of the process of the present invention, the at least one silicate separated off as described above is washed and/or dried.

Accordingly, the present invention also relates to a process as described above, additionally comprising
(4) washing
and/or
(5) drying
of the silicate obtained according to (3).

The separation can be followed by at least one washing step and/or at least one drying step, wherein it is possible to use identical or different washing agents or washing agents mixtures in at least two washing steps and to use identical or different drying temperatures in at least two drying steps.

The drying temperatures here are preferably in the range of from room temperature to 95° C., more preferably of from 40 to 90° C., more preferably of from 50 to 85° C., more preferably in the range of from 60 to 80° C., and particularly preferably in the range of from 70 to 80° C.

Accordingly, the present invention also relates a process as described above, wherein the silicate is washed with water according to (4) and/or is dried according to (5) at a temperature in the range of from room temperature to 80° C.

Washing agents which may be used are, for example, water, alcohols, such as methanol, ethanol or propanol, or mixtures of two or more thereof. Examples of mixtures are mixtures of two or more alcohols, such as methanol and ethanol or methanol and propanol or ethanol and propanol or methanol and ethanol and propanol, or mixtures of water and at least one alcohol, such as water and methanol or water and ethanol or water and propanol or water and methanol and ethanol or water and methanol and propanol or water and ethanol and propanol or water and methanol and ethanol and propanol. Water or a mixture of water and at least one alcohol, preferably water and ethanol, is preferred, water being very particularly preferred as the only washing agent.

According to the process of the present invention, a silicate, in particular a layered silicate, is obtained.

The present invention accordingly also relates to a silicate, in particular a layered silicate, obtainable by the process described above.

The present invention also relates to the silicate per se, wherein, in the X-ray diffraction pattern by Cu K alpha 1 radiation, at least the following reflections occur:

| Intensity [%] | Diffraction angle 2θ/° [Cu K (alpha 1)] |
|---|---|
| 100 | 8.0-8.4 |
| 11-21 | 11.0-11.4 |
| 13-23 | 13.2-13.6 |
| 5-15 | 18.0-18.4 |
| 7-17 | 18.4-18.8 |
| 19-29 | 19.9-20.0 | wherein 100% relates to the intensity of the maximum peak in the X-ray diffraction pattern.

In particular, the present invention relates to the silicate per se, wherein, in the X-ray diffraction pattern by Cu K alpha 1 radiation, at least the following reflections occur:

| Intensity [%] | Diffraction angle 2θ/° [Cu K (alpha 1)] |
|---|---|
| 100 | 8.0-8.4 |
| 11-21 | 11.0-11.4 |
| 13-23 | 13.2-13.6 |
| 5-15 | 18.0-18.4 |
| 7-17 | 18.4-18.8 |
| 19-29 | 19.8-20.2 |
| 20-30 | 22.0-22.35 |
| 6-16 | 22.36-22.7 |
| 23-33 | 23.3-23.59 |
| 22-32 | 23.60-23.8 |

The layered silicates according to the invention or layered silicates prepared according to the invention preferably have the space group P 2/c. If, as described above, tetraalkylammonium hydroxide and silica and/or silica precursor were used as starting materials, the layered silicates prepared according to the invention preferably have the following lattice parameters, determined by Rietveld analysis:
a=7.33(1) Å
b=10.72(1) Å
c=17.51(1) Å
beta=115.7(1)°.

The Rietveld analysis is described in R. A. Young (editor), The Rietveld Method, Oxford University Press, 1995, Oxford, in particular in Chapter 7: Analytical profile fitting of X-ray powder diffraction profiles in Rietveld analysis, pages 111-131.

According to 29-Si MAS NMR spectroscopy, the layered silicates according to the invention have a low field signal at about 104 ppm, which is characteristic of a silanol group typical of layered silicates.

According to 1-H NMR spectroscopy, the layered silicates according to the invention have a low field signal at about 16.4 ppm, which is characteristic of a silanol group typical of layered silicates.

The given chemical shifts are based on TMF as an internal standard.

According to a particularly preferred embodiment of the process of the present invention, the silicate obtained according to (2) is calcined according to (6) in at least one additional step.

It is in principle possible to subject the suspension comprising the at least one silicate directly to calcination. Preferably, the silicate is separated off from the suspension, as described above according to (3), before the calcination.

Before the calcination, the silicate separated off from the suspension can be subjected to at least one washing step (4) as described above and/or at least one drying step (5) as described above. Preferably, the silicate separated off from the suspension is dried and is fed to the calcination without a washing step.

The calcination according to (6) of the silicate obtained according to (2) and/or (3) and/or (4) and/or (5) is preferably effected at a temperature in the range of up to 600° C. to give a tectosilicate.

Thereby, according to a preferred embodiment of the process of the present invention, the heating of the silicate is carried out from room temperature to a temperature of up to 600° C., the heating rate further preferably being in the range of from 0.1 to 12° C./h, more preferably of from 1 to 11° C./h, and particularly preferably in the range of from 5 to 10° C./h.

Calcination temperatures of from 300 to 600° C. are particularly preferred.

According to a possible embodiment of the process of the present invention, the calcination is carried out stepwise at successive temperatures. The term "stepwise at successive temperatures" as used in the context of the present invention refers to a calcination in which the silicate to be calcined is heated to a certain temperature, is kept at this temperature for a certain time, and is heated from this temperature to at least one further temperature and is once again kept there for a certain time.

The silicate to be calcined is preferably kept at up to 4, more preferably at up to 3, particularly preferably at 2 temperatures.

In this respect, the first temperature is preferably in the range of from 500 to 540° C., more preferably in the range of from 500 to 535° C., more preferably in the range of from 510 to 530° C., and particularly preferably in the range of from 515 to 525° C. This temperature is preferably kept for a period of from 8 to 24 h, more preferably from 9 to 18 h, and in particular from 10 to 14 hours.

The second temperature is preferably in the range of from greater than 540 to 600° C., more preferably in the range of from 550 to 580° C., and particularly preferably in the range of from 555 to 570° C. This temperature is preferably kept for a period in the range of from 0.5 to 6 h, more preferably of from 1 to 4 h, and in particular of from 1 to 3 hours.

Accordingly, the present invention also relates to a process as described above, wherein the calcination is effected stepwise at successive temperatures in the range of up to 600° C., preferably from 300 to 600° C.

The calcination can be effected in any suitable atmosphere, for example air, lean air, nitrogen, steam, synthetic air or carbon dioxide. The calcination is preferably effected under air.

The calcination can be carried out in any apparatus suitable for this purpose. The calcination is preferably effected in a rotating tube, in a belt calciner, in a muffle furnace, or in situ in an apparatus in which the silicate is subsequently used for the intended purpose, for example as a molecular sieve or for another application described below. A rotating tube and a belt calciner are particularly preferred here.

According to the process of the present invention, a silicate, in particular a tectosilicate, is obtained.

Accordingly, the present invention also relates to a process as described above, additionally comprising
(6) calcination of the silicate obtained according to (2) and optionally separated off according to (3) and optionally washed according to (4) and/or dried according to (5) to give a tectosilicate.

The present invention accordingly also relates to a silicate, in particular a tectosilicate, obtainable by the process described above, comprising the calcination according to (6), in particular the tectosilicate obtainable using DMDEAH and/or DMDPAH.

The present invention also relates to a silicate per se, wherein, in the X-ray diffraction pattern by Cu K alpha 1 radiation, at least the following reflections occur:

| Intensity [%] | Diffraction angle 2θ/° [Cu K (alpha 1)] |
|---|---|
| 100 | 9.8-10.2 |
| 24-34 | 11.0-11.4 |
| 9-19 | 15.5-15.9 |
| 12-22 | 19.4-19.6 |
| 19-29 | 19.6-19.8 | wherein 100% relates to the intensity of the maximum peak in the X-ray diffraction pattern In particular, the present invention relates to the tectosilicate per se, wherein, in the X-ray diffraction pattern by Cu K alpha 1 radiation, at least the following reflections occur:

| Intensity [%] | Diffraction angle 2θ/° [Cu K (alpha 1)] |
|---|---|
| 100 | 9.8-10.2 |
| 24-34 | 11.0-11.4 |
| 9-19 | 15.5-15.9 |
| 12-22 | 19.4-19.6 |
| 19-29 | 19.6-19.8 |
| 8-18 | 26.2-<26.3 |
| 8-18 | 26.3-<26.4 |
| 13-23 | 26.4-26.6 |

The tectosilicates of the present invention or tectosilicates prepared according to the invention preferably have the space group P 2/c. If, as described above, tetraalkylammonium hydroxide and silica and/or silica precursor were used as starting materials, the tectosilicates prepared according to the invention preferably have the following lattice parameters, determined by Rietveld analysis:

a=7.34(1) Å
b=8.72(1) Å
c=17.17(1) Å
beta=114.2(1)°.

According to 29-Si MAS NMR spectroscopy, the low field signal at about 104 ppm which is found in the case of the layered silicates of the present invention described above and which is characteristic of a silanol group typical of layered silicates, is absent in the case of the novel tectosilicates.

The novel tectosilicates preferably have 8 MR and 10 MR channels, the 8 MR channels particularly preferably being parallel to c of the unit cell, as stated above, and the 10 MR channels particularly preferably being parallel to a of the unit cell, as stated above. Regarding the definition of the 8 MR and 10 MR channels, reference is made to Ch. Baerlocher, W. M. Meier, D. H. Olson, Atlas of Zeolite Framework Types, 5th Edition, 2001, Elsevier, pages 10-15.

In particular, the tectosilicates of the present invention are characterized in that they have a substantially monomodal distribution with respect to the two-dimensional 8 MR and 10 MR channel pore structure. The pore openings both of the 8 MR and of the 10 MR channels each have in this respect an area preferably in the range of $(5.70\text{-}6.00)\times(4.00\text{-}4.20)$ Å$^2$, particularly preferably of $(5.80\text{-}5.90)\times(4.05\text{-}4.15)$ Å$^2$.

The tectosilicates of the present invention preferably have micropores having a specific surface in the range of greater than 200 m$^2$/g, more preferably of from greater than 200 to 800 m$^2$/g, more preferably of from 300 to 700 m$^2$/g, and particularly preferably of from 400 to 600 m$^2$/g, determined in each case according to DIN 66135 (Langmuir).

The tectosilicates of the present invention preferably have pores having a pore volume in the range of from 0.15 to 0.21 ml/g, more preferably of from 0.16 to 0.20 ml/g, and particularly preferably of from 0.17 to 0.19 ml/g, determined in each case according to DIN 66134.

Accordingly, the tectosilicates of the present invention are silicates of a microporous zeolitic type.

The thermal stability of the tectosilicates of the present invention is preferably at least 600° C., more preferably more than 600° C.

The term "thermal stability" as used in this context for the purposes of the present invention denotes the temperature at which the specific lattice structure of the tectosillicate is preserved under atmospheric pressure.

According to further embodiments of the present invention, it is possible for the silicates prepared according to the invention to contain at least one atom of at least one other element in addition to silicon and oxygen. Thus, it is possible to incorporate at least one atom of at least one of the elements aluminum, boron, iron, titanium, tin, germanium, zirconium, vanadium or niobium into the silicate structure.

If, for example, aluminum is incorporated, it is possible to use, for example, metallic aluminum or suitable aluminates, such as alkali metal aluminates, and/or aluminum alcoholates, such as aluminum triisopropylate, in addition to the tetraalkylammonium compound and the silica and/or silica precursor as starting materials.

If, for example, boron is incorporated, it is possible to use, for example, free boric acid and/or borates and/or boric esters, such as triethyl borate, in addition to the tetraalkylammonium compound and the silica and/or silica precursor as starting materials.

If, for example, titanium is incorporated, it is possible to use, for example, titanium alcoholates, such as titanium ethanolates or titanium propylates, in addition to the tetraalkylammonium compounds and the silica and/or silica precursor as starting materials.

If, for example, tin is incorporated, it is possible to use, for example, tin chlorides and/or organometallic tin compounds, such as tin alcoholates, or chelates, such as tin acetylacetonates, in addition to the tetraalkylammonium compound and the silica and/or silica precursor as starting materials.

If, for example, zirconium is incorporated, it is possible to use, for example, zirconium chloride and/or zirconium alcoholates in addition to the tetraalkylammonium compound and the silica and/or silica precursor as starting materials.

If, for example, vanadium or germanium or niobium is incorporated, it is possible to use for example, vanadium chloride or germanium chloride or niobium chloride in addition to the tetraalkylammonium compound and the silica and/or silica precursor as starting materials.

Accordingly, the present invention also relates to a process as described above and to the layered silicates and/or the tecosilicates as described above, in particular the tectosilicates as described above, wherein the silicates additionally contain at least one of the elements Al, B, Fe, Ti, Sn, Ge, Zr, V or Nb in addition to Si and O.

Depending on the type of atoms which are incorporated into the lattice, a negatively charged framework which makes it possible, for example, to load the silicate with cations may form. Inter alia, the ammonium ions $R_1R_2R_3R_4N^+$ of the template compounds, platinum, palladium, rhodium or ruthenium cations, gold cations, alkali metal cations, for example sodium or potassium ions, or alkaline earth metal cations, for example magnesium or calcium ions, may be mentioned as such.

In many technical applications, the user often desires to employ the crystalline material which has been processed to moldings, instead of the crystalline material as such. Such moldings are necessary in particular in many industrial processes, in order, for example, to be able to expediently operate separations of substances from mixtures in, for example, tube reactors.

The present invention accordingly also relates to a molding comprising the crystalline, microporous tectosilicate described above. The present invention also comprises moldings comprising the layered silicate described above.

In general, the molding may comprise all conceivable further compounds in addition to the tectosilicate of the present invention, provided that it is ensured that the resulting molding is suitable for the desired application.

In the context of the present invention, it is preferred if at least one suitable binder material is used in the production of the molding. In the context of this preferred embodiment, more preferably a mixture of tectosilicate and the at least one binder is prepared.

Accordingly, the present invention also describes a process for the production of a molding containing a tectosilicate as described above, comprising the step
(I) preparation of a mixture containing a tectosilicate as described above or a tectosilicate obtainable by a process as described above, and at least one binder material.

Suitable binders are in general all compounds which impart adhesion and/or cohesion between the particles of the tectosilicate which are to be bound, over and above the physisorption which may be present without a binder. Examples of such binders are metal oxides, such as $SiO_2$, $Al_2O_3$, $TiO_2$, $ZrO_2$ or MgO, or clays or mixtures of two or more of these compounds.

As $Al_2O_3$ binders, clay minerals and naturally occurring or synthetic aluminas, for example alpha-, beta-, gamma-, delta-, eta-, kappa-, chi- or theta-alumina and the inorganic or organometallic precursor compounds thereof, such as gibbsite, bayerite, boehmite, pseudoboehmite or trialkoxyaluminates, such as aluminum triisopropylate are preferred in particular. Further preferred binders are amphiphilic compounds having a polar and a nonpolar moiety, and graphite. Further binders are, for example, clays, such as montmorillonites, kaolins, bentonites, halloysites, dickites, nacrites or anaxites.

These binders can be used as such. In the context of the present invention, it is also possible to use compounds from which the binder is formed in at least one further step in the production of the moldings. Examples of such binder precursors are tetraalkoxysilanes, tetraalkoxytitanates, tetraalkoxyzirconates or a mixture of two or more different tetraalkoxysilanes or a mixture of two or more different tetraalkoxytitanates or a mixture of two or more different tetraalkoxyzirconates or a mixture of at least one tetraalkoxysilane and at least one tetraalkoxytitanate or of at least one tetraalkoxysilane and at least one tetraalkoxyzirconate or of at least one tetraalkoxytitanate and at least one tetraalkoxyzirconate or a mixture of at least one tetraalkoxysilane and at least one tetraalkoxytitanate and at least one tetraalkoxyzirconate.

In the context of the present invention, binders which either completely or partly consist of $SiO_2$ or are a precursor of $SiO_2$, from which $SiO_2$ is formed in at least one further step in the production of the moldings are very particularly preferred. In this context, both colloidal silica and "wet process" silica as well as "dry process" silica can be used. These are very particularly preferably amorphous silica, the size of the silica particles being, for example, in the range of from 5 to 100 nm and the surface of the silica particles being in the range of from 50 to 500 $m^2/g$.

Colloidal silica, preferably in the form of an alkaline and/or ammoniacal solution, more preferably in the form of an ammoniacal solution, is, for example, commercially available as, inter alia, Ludox®, Syton®, Nalco® or Snowtex®.

"Wet process" silica is, for example, commercially available, inter alia, as Hi-Sir), Ultrasil®, Vulcasil®, Santocel®, Valron-Estersil®, Tokusil® or Nipsil®.

"Dry process" silica is, for example, commercially available, inter alia, as Aerosil®, Reolosil®, Cab-O-Sil®, Fransil® or ArcSilica®.

In the context of the present invention, inter alia an ammoniacal solution of colloidal silica is preferred.

Accordingly, the present invention also describes a molding as described above, additionally comprising $SiO_2$ as binder material.

The present invention also relates to a process as described above, the binder used according to (I) being a $SiO_2$-containing or $SiO_2$-forming binder.

Accordingly, the present invention also describes a process as described above, the binder being a colloidal silica.

The binders are preferably used in an amount which leads to the finally resulting moldings whose binder content is up to 80% by weight, more preferably in the range of from 5 to 80% by weight, more preferably in the range of from 10 to 70% by weight, more preferably in the range of from 10 to 60% by weight, more preferably in the range of from 15 to 50% by weight, more preferably in the range of from 15 to 45% by weight, particularly preferably in the range of from 15 to 40% by weight, based in each case on the total weight of the finally resulting molding.

The term "finally resulting molding" as used in the context of the present invention relates to a molding as obtained from the drying and calcining steps (IV) and/or (V), as described below, particularly preferably obtained from (V).

The mixture of binder or precursor of a binder and a zeolitic material can be mixed with at least one further compound for further processing and for the formation of a plastic material. Here, inter alia, pore formers may preferably be mentioned.

In the process of the present invention, all compounds which, with regard to the finished molding, provide a certain pore size and/or a certain pore size distribution and/or certain pore volumes can be used as pore formers.

Preferably used pore formers in the process of the present invention are polymers which are dispersible, suspendable or emulsifiable in water or in aqueous solvent mixtures. Preferred polymers here are polymeric vinyl compounds, for example polyalkylene oxides, such as polyethylene oxides, polystyrene, polyacrylates, polymethacrylates, polyolefins, polyamides and polyesters, carbohydrates, such as cellulose or cellulose derivatives, for example methylcellulose, or sugars or natural fibers. Further suitable pore formers are, for example, pulp or graphite.

If pore formers are used in the preparation of the mixture according to (I), the pore former content, preferably the polymer content of the mixture according to (I) is preferably in the range of from 5 to 90% by weight, preferably in the range of from 15 to 75% by weight, and particularly preferably in the range of from 25 to 55% by weight, based in each case on the amount of novel tectosilicate in the mixture according to (I).

If desired for the pore size distribution to be achieved, a mixture of two or more pore formers may also be used.

In a particularly preferred embodiment of the process of the present invention, as described below, the pore formers are removed in a step (V) by calcination to give the porous molding. According to a preferred embodiment of the process of the invention, moldings which have pores in the range of at least 0.6 ml/g, preferably in the range of from 0.6 to 0.8 ml/g, and particularly preferably in the range of from more than 0.6 to 0.8 ml/g, determined according to DIN 66134, are obtained thereby.

The specific surface of the novel moldings is in general at least 350 $m^2/g$, preferably at least 400 $m^2/g$, and particularly preferably at least 425 $m^2/g$, determined according to DIN 66131. For example, the specific surface may be in the range of from 350 to 500 $m^2/g$ or of from 400 to 500 $m^2/g$ or of from 425 to 500 $m^2/g$.

Accordingly, the present invention also describes a molding as described above, having a specific surface of at least 350 $m^2/g$, comprising pores having a pore volume of at least 0.6 ml/g.

In the context of a likewise preferred embodiment of the present invention, at least one pasting agent is added in the preparation of the mixture according to (I).

Pasting agents which may be used are all compounds suitable for this purpose. These are preferably organic, in particular hydrophilic polymers, for example cellulose, cellulose derivatives, such as methylcellulose, starch, such as potato starch, wallpaper paste, polyacrylates, polymethacrylates, polyvinyl alcohol, polyvinylpyrrolidone, polyisobutene or polytetrahydrofuran.

Accordingly, in particular compounds which also act as pore formers can be used as pasting agents.

In a particularly preferred embodiment of the process of the present invention as described below, these pasting agents are removed in a step (V) by calcination to give the porous molding.

According to a further embodiment of the present invention, at least one acidic additive is added during the preparation of the mixture according to (I). Organic acidic compounds which can be removed in the preferred step (V), as described below, by calcination are very particularly preferred. Carboxylic acids, for example formic acid, oxalic acid and/or citric acid, are particularly preferred. It is also possible to use two or more of these acidic compounds.

The order of addition of the components of the mixture according to (I) which contains the tectosilicate is not critical. It is both possible first to add the at least one binder, then the at least one pore former and the at least one acidic compound and finally the at least one pasting agent and to interchange the sequence with regard to the at least one binder, the at least one pore former, the at least one acidic compound and the at least one pasting agent.

After the addition of the binder to the tectosilicate solid, to which, if appropriate, at least one of the compounds described above have already been added, the mixture according to (I) is, as a rule, homogenized for from 10 to 180 minutes. Inter alia, kneaders, edge mills or extruders are particularly preferably used for the homogenization. The mixture is preferably kneaded. On the industrial scale, treatment in an edge mill is preferably employed for the homogenization.

Accordingly, the present invention also describes a process as described above, comprising the steps
(I) preparation of a mixture containing a tectosilicate as described above or a tectosilicate obtainable by a process as described above, and at least one binder;
(II) kneading of the mixture.

The homogenization is carried out as a rule at temperatures in the range of from about 10° C. to the boiling point of the pasting agent and normal pressure or slightly superatmospheric pressure. Thereafter, if appropriate, at least one of the compounds described above can be added. The mixture thus obtained is homogenized, preferably kneaded, until an extrudable plastic material has formed.

According to a more preferred embodiment of the invention, the homogenized mixture is molded.

In the context of the present invention, those processes in which the molding is effected by extrusion in conventional extruders, for example to give extrudates having a diameter of preferably from 1 to 10 mm, particularly preferably from 2 to 5 mm, are preferred for the shaping processes. Such extrusion apparatuses are described, for example, in Ullmann's Enzyklopädie der Technischen Chemie, 4th Edition, Vol. 2, page 295 et seq., 1972. In addition to the use of a screw-type extruder, a plunger-type extruder is also preferably used for the molding.

In principle, however, all known and/or suitable kneading and molding apparatuses and processes may be used for the shaping. Examples of these are inter alia:
(i) briquetting, i.e. mechanical compression with or without addition of additional binder material;
(ii) pelleting, i.e. compacting by circular and/or rotational movements;
(iii) sintering, i.e. the material to be molded is subjected to a thermal treatment.

For example, the shaping can be selected from the following group, the combination of at least two of these methods being explicitly included: briquetting by treatment in a ram press, treatment in a roll press or treatment in a ring-roll press, briquetting without a binder; pelleting, melting, spinning techniques, deposition, foaming, spray drying; firing in a shaft furnace, convection oven, moving grate or rotary kiln, treatment in an edge mill.

The compacting may take place at ambient pressure or at a pressure above ambient pressure, for example in a pressure range from 1 to several hundred bar. Furthermore, the compacting may take place at ambient temperature or at a temperature above ambient temperature, for example in a temperature range from 20 to 300° C. If drying and/or firing are part of the shaping step, temperatures up to 600° C. are conceivable. Finally, the compacting may take place in the ambient atmosphere or in a controlled atmosphere. Controlled atmospheres are, for example, inert gas atmospheres and reducing and/or oxidizing atmospheres.

Accordingly, the present invention also describes a process for the production of a molding as described above, comprising the steps
(I) preparing of a mixture containing a tectosilicate as described above or a tectosilicate obtainable by a process as described above, and at least one binder;
(II) kneading of the mixture;
(III) molding of the kneaded mixture to give at least one molding.

The shape of the moldings produced according to the invention can be chosen as desired. In particular, inter alia spheres, oval shapes, cylinders or tablets are possible.

In the context of the present invention, molding by extrusion of the kneaded mixture obtained according to (II) is particularly preferably carried out, more preferably substantially cylindrical extrudates having a diameter of from 1 to 20 mm, preferably in the range of from 1 to 10 mm, more preferably in the range of from 2 to 10 mm and more preferably in the range of from 2 to 5 mm, being obtained as extrudates.

In the context of the present invention, step (III) is preferably followed by at least one drying step. This at least one drying step is effected at temperatures in the range of, in general, from 80 to 160° C., preferably from 90 to 145° C., particularly preferably from 100 to 130° C., the duration of drying generally being 6 hours or more, for example from 6 to 24 hours. However, depending on the moisture content of the material to be dried, shorter drying times, for example about 1 hour or 2, 3, 4 or 5 hours, are also possible.

Before and/or after the drying step, the preferably obtained extrudate can, for example, be comminuted. Granules or chips having a particle diameter of from 0.1 to 5 mm, in particular from 0.5 to 2 mm, are preferably obtained.

Accordingly, the present invention also describes a process for the production of a molding as described above, comprising the step
(I) preparing of a mixture containing a tectosilicate as described above or a tectosilicate obtainable by a process as described above, and at least one binder;
(II) kneading of the mixture;
(III) molding of the kneaded mixture to give at least one molding;
(IV) drying of the at least one molding.

In the context of the present invention, the step (IV) is preferably followed by at least one calcination step. The calcination is carried out at temperatures in the range of, in general, from 350 to 750° C., preferably from 450 to 600° C.

The calcination can be effected under any suitable gas atmosphere, air and/or lean air being preferred. Furthermore, the calcination is preferably carried out in a muffle furnace, a rotary kiln and/or a belt calcination oven, the duration of calcination generally being 1 hour or more, for example from 1 to 24 hours or from 3 to 12 hours. Accordingly, for the purposes of the process of the present invention, it is possible, for example, to calcine the molding once, twice or more often for, in each case, at least 1 hour, for example in each case from 3 to 12 hours, it being possible for the temperatures during a calcination step to remain constant or to be changed continuously or discontinuously. If calcination is effected twice or more often, the calcination temperatures can be different or identical in the individual steps.

Accordingly, the present invention also relates to a process for the production of a molding as described above, comprising the steps
(I) preparing of a mixture containing a tectosilicate as described above or a tectosilicate obtainable by a process as described above, and at least one binder;
(II) kneading of the mixture;
(III) molding of the kneaded mixture to give at least one molding;
(IV) drying of the at least one molding;
(V) calcining of the at least one dried molding.

After the calcination step, the calcined material can, for example, be comminuted. Granules or chips having a particle diameter of from 0.1 to 5 mm, in particular from 0.5 to 2 mm, are preferably obtained.

Before and/or after the drying and/or before and/or after the calcination, the at least one molding can, if appropriate, be treated with a concentrated or dilute Broenstedt acid or a mixture of two or more Broenstedt acids. Suitable acids are, for example, hydrochloric acid, sulfuric acid, phosphoric acid, nitric acid or carboxylic acids, dicarboxylic acids or oligo- or polycarboxylic acids, such as nitrilotriacetic acid, sulfosalicylic acid or ethylenediaminetetraacetic acid.

If appropriate, this at least one treatment with at least one Broenstedt acid is followed by at least one drying step and/or at least one calcination step, which in each case is carried out under the conditions described above.

According to a further embodiment of the process of the present invention, the moldings obtained according to the invention can, for better hardening, be subjected to a water steam treatment, after which preferably drying is effected at least once again and/or calcination is effected at least once again. For example, after at least one drying step and at least one subsequent calcination step, the calcined molding is subjected to the steam treatment and is then dried at least once again and/or calcined at least once again.

The moldings obtained according to the invention have hardnesses which are in general in the range of from 2 to 15 N, preferably in the range of from 5 to 15 N, particularly preferably in the range of from 10 to 15 N.

Accordingly, the present invention also relates to a molding as described above, having a cutting hardness in the range of from 2 to 15 N.

In the context of the present invention, the hardness described above was determined on an apparatus from Zwick, type BZ2.5/TS1S, with a preliminary force of 0.5 N, a preliminary force feed rate of 10 mm/min and a subsequent test speed of 1.6 mm/min. The apparatus had a stationary turntable and a freely movable ram with a built-in blade of 0.3 mm thickness. The movable ram with the blade was connected to a load cell for force transduction and moved during the measurement toward the stationary turntable on which the catalyst molding to be investigated rested. The tester was controlled by means of a computer which recorded and evaluated the results of the measurements. The values obtained are the mean value of the measurements for, in each case, 10 catalyst moldings. The catalyst molding had a cylindrical geometry, their mean length corresponding to about twice to three times the diameter, and were loaded with the blade of 0.3 mm thickness with increasing force until the molding had been cut through. The blade was applied to the molding perpendicularly to the longitudinal axis of the molding. The force required for this purpose is the cutting hardness (unit N).

The present invention moreover relates to the use of the silicates of the invention, in particular of the novel tectosilicates, and/or of the moldings of the invention, as a molecular sieve, catalyst, catalyst support or binder thereof, as adsorbents, pigments, additives in detergents, an additive for building materials, for imparting thixotropic properties to coating pastes and finishes, and applications as external and internal lubricant, as flameproofing agent, auxiliary agent and filler in paper products, in bactericidal and/or fungicidal and/or herbicidal compositions, for ion exchange, for the production of ceramics, in polymers, in electrical, optical or electrooptical components and switching elements or sensors.

Reactions which can be catalyzed by the silicates of the invention are, for example, hydrogenations, dehydrogenations, oxydehydrogenations, oxidations, epoxidations, polymerization reactions, aminations, hydrations and dehydrations, nucleophilic and electrophilic substitution reactions, addition and elimination reactions, double bond and skeletal isomerizations, dehydrocyclizations, hydroxylations or heteroaromatics, epoxide-aldehyde rearrangement reactions, metathesis, olefin preparation for methanol, Diels-Alder reactions, formation of carbon-carbon bonds, for example olefin dimerization or olefin trimerization, and condensation reactions of the aldol condensation type. Depending on the molecule to be reacted, the catalytic reactions can be carried out in the gas or liquid phase or in the supercritical phase.

The silicates of the present invention are also particularly suitable as a molecular sieve. Here, the high internal surface of the material of the invention can be advantageously utilized, as well as separating molecules from one another on the basis of their difference in molecular size. Depending on the separation task, the respective adsorption can be effected in the gas phase or the liquid phase or in the supercritical phase.

In a first embodiment, the novel silicates are suitable for separating constitutional isomers, for example for separating n- and iso-isomers of small molecules. In the context of the present invention, the term "small molecule" is understood as molecules having a kinetic diameter in the range of from 3.5 to 5.5 Å. For the definition of the kinetic diameter, reference may be made to D. W. Breck, Zeolite Molecular Sieves, 1974, J. Wiley, pages 634-641.

Separation of n-butane and isobutane may be mentioned by way of example in this context.

In a second embodiment, the silicates of the invention are suitable for the separation of configurational isomers, for example for the separation of cis-butene and trans-butene.

The present invention relates very generally to the use of the silicates of the invention, in particular of the tectosilicates, for the separation of at least one alkane and/or at least one alkene and/or at least one alkyne from a mixture containing at least two alkanes or at least two alkenes or at least two alkynes or at least one alkane and at least one alkene or at least one alkane and at least one alkyne or at least one alkene and at least one alkyne or at least one alkane and at least one alkene and at least one alkyne, in particular for the separation of constitutional isomers and/or configurational isomers, the at least one alkane and/or at least one alkene and/or at least one alkyne having up to 10 carbon atoms, for example one carbon atom in the case of methane or 2, 3, 4, 5, 6, 7, 8, 9 or 10 carbon atoms.

The present invention preferably relates to the use of the silicates of the invention, in particular of the tectosilicates, for the separation of at least one alkane and/or at least one alkene and/or at least one alkyne from a gas mixture containing at least two alkanes or at least two alkenes or at least two alkynes or at least one alkane and at least one alkene or at least one alkane and at least one alkyne or at least one alkene and at least one alkyne or at least one alkane and at least one alkene and at least one alkyne, in particular for the separation of constitutional isomers and/or configurational isomers.

Particularly preferred fields of use are the separation of methane and ethane or the separation of ethene, propene and butene, in particular trans-2-butene, or the separation of butane and butene or the separation of n-butane and isobutane or the separation of 1-butene and trans-2-butene.

The silicates of the invention therefore permit an easy separation of mixtures which have a narrow boiling range, which cannot be separated by distillative methods without large apparatuses or without the aid of additives. This makes it possible to reduce costs in chemical production processes. In such processes, the tectosilicate of the invention as such or preferably in the form of moldings is used in at least one suitable apparatus, for example a tubular reactor, through which the mixture to be separated is passed continuously or batchwise, preferably continuously.

The present invention accordingly also relates to an apparatus, in particular a tubular reactor, comprising at least one tectosilicate as described above and/or a molding as described above for the separation of a mixture, in particular for the separation of at least one alkane and/or at least one alkene and/or at least one alkyne from a gas mixture containing at least two alkanes or at least two alkenes or at least two alkynes or at least one alkane and at least one alkene or at least one alkane and at least one alkyne or at least one alkene and at least one alkyne or at least one alkane and at least one alkene and at least one alkyne.

According to a particularly preferred embodiment, such a tubular reactor has a length:width ratio greater than or equal to, preferably greater than 3:1.

Likewise, the silicate of the present invention or the silicate prepared according to the present invention, in particular the tectosilicate or the moldings containing said silicate, can be also used, for example, for the separation of olefin and carbondioxide, for example for the purification of polyethylene or polypropylene, or as amination catalyst, for example for the preparation of methyl amine and/or dimethyl amine from methanol and ammonia or from synthesis gas and ammonia wherein a low fraction of trimethylamine is preferably obtained, or for polymerizations such as for the preparation of polytetrahydrofuran from tetrahydrofuran, or as hydroxylation catalyst such as for the preparation of phenol from benzene, or generally as reaction catalyst for conversions of 6-ring aromatic compounds, or for the conversion of cyclohexanone to cyclohexanone oxime, or for Beckmann re-arrangements such as for the conversion of cyclohexanone oxime to caprolactam.

Surprisingly, it was found that the novel material, in particular the novel tectosilicate having the structure RUB-41, has a very high uptake capacity for 6-ring aromatic or heteroaromatic compounds, especially benzene. Therefore, it is envisaged to use the novel material also for the separation of benzene from mixtures containing benzene.

If the novel tectosilicate or the molding containing this tectosilicate is used as an adsorbent, for example for the separation of substances, the desorption of the adsorbed compound or of the adsorbed compounds can be effected by a suitable reduction of the pressure and/or a suitable temperature change, particularly preferably by a suitable temperature increase and/or by bringing the tectosilicate or the molding containing this tectosilicate into contact with at least one compound which adsorbs more strongly than the compound to be desorbed or compounds to be desorbed.

Depending on the method of use of the tectosilicate of the invention it may be necessary to regenerate the tectosilicate or the molding containing the tectosilicate after a certain time of use.

In a further embodiment of the process of the present invention, the tectosilicate and/or the molding are regenerated after the use in the respective technical field by a process in which the regeneration is effected by controlled burning off of the deposits responsible for the decreasing performance. An inert gas atmosphere which contains exactly defined amounts of oxygen-donating substances is preferably employed for this purpose. Such a regeneration process is described, inter alia, in WO 98/55228 and DE 197 23 949 A1, particularly in column 2, lines 33 to 54 of DE 197 23 949 A1, the relevant disclosure of which is hereby incorporated by reference in its entirety in the subject of the present application.

The tectosilicate to be regenerated and/or the moldings are heated to a temperature in the range of from 250 to 600° C., preferably of from 400 to 550° C., in particular of from 450 to 500° C., either in the apparatus, for example the tubular reactor, or in an external oven, in an atmosphere which contains from 0.1 to about 20 parts by volume of oxygen-donating substances, particularly preferably from 0.1 to 20 parts by volume of oxygen. The heating is preferably carried out at a heating rate of from 0.1 to 20° C./min, preferably from 0.3 to 15° C./min, and in particular from 0.5 to 10° C./min.

During this heating phase, heating is effected to a temperature at which most organic deposits begin to decompose while at the same time the temperature is controlled via the oxygen content and therefore does not increase in a manner such that the tectosilicate structure and/or molding structure is damaged. The slow increase in the temperature or the residence at low temperature by establishing the corresponding oxygen content and the corresponding heating power is a substantial step for preventing local overheating of the tectosilicate and/or of the moldings at high organic loads.

If the temperature of the waste gas stream at the reactor exit decreases in spite of increasing amounts of oxygen-donating substances in the gas stream, burning off of the organic deposits is complete. The duration of the treatment is generally in each case from 1 to 30, preferably from about 2 to about 20, in particular from about 3 to about 10 hours.

The subsequent cooling of the tectosilicate regenerated in this manner and/or of the molding is preferably carried out in a manner such that the cooling does not take place too rapidly, since otherwise the mechanical strength, for example of the moldings, may be adversely affected.

It may be necessary to follow the regeneration carried out by calcination, as described above, with washing with water and/or dilute acids, for example hydrochloric acid, in order to remove any inorganic load (traces of alkali, etc.) remaining as a result of contamination of the starting materials. Further drying and/or further calcination can then be carried out.

According to a further embodiment of the process of the present invention, the tectosilicate at least partly deactivated for the respective technical field of use and/or the moldings can be washed with a solvent in the reaction reactor or in an external reactor in order to remove desired product which is still adhering, before the heating according to the regeneration procedure. The washing is carried out here in a manner such that, although the respective adhering desired products can be removed, temperature and pressure are not chosen to be so high that most organic deposits are likewise removed. Preferably, only washing with a suitable solvent is carried out. Thus, all solvents in which the respective desired product is readily soluble are suitable for this wash process. The amount of solvent used and the duration of the wash process are not critical. The wash process can be repeated several times and can be carried out at elevated temperatures. With the use of $CO_2$ as a solvent, supercritical pressure is preferred; otherwise, the wash process can be effected under normal pressure or elevated pressure or supercritical pressure. After the end of the wash process, drying is generally effected. Although the drying process is in general not critical, the drying temperature should not too greatly exceed the boiling point of the solvent used for the washing, in order to avoid abrupt vaporization of the solvent in the pores, in particular in the micropores, since this too may lead to damage to the lattice structure.

For process optimization, it is possible to use at least two apparatuses which in each case contain the tectosilicate of the present invention and/or the moldings of the present invention, in the case of the regeneration at least one apparatus being taken out of operation and at least one apparatus remaining in operation so that the process does not have to be interrupted at any time.

The present invention is explained in more detail with reference to the examples, figures and tables described below.

EXAMPLES

Example 1

Figure 1:
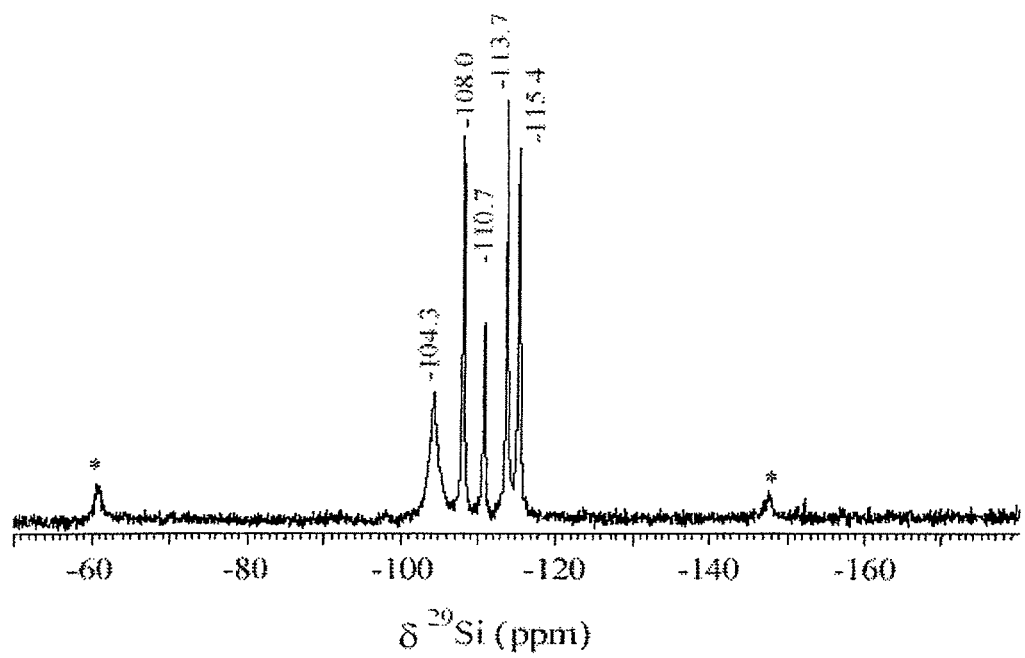
FIG. 1 shows the 29-Si MAS NMR spectrum of the dried layered silicate having the structure RUB-39 and obtained according to example 2. TMS was used as standard. The solid-state NMR spectrum was recorded using a Bruker ASX 400 with the use of a conventional 7 mm Bruker sample head. The samples were rotated at room temperature through the magic angle at about 5 kHz spinning speed. For the quantitative spectrum, the HP DEC (high power decoupled) pulse program was used.
Figure 2:
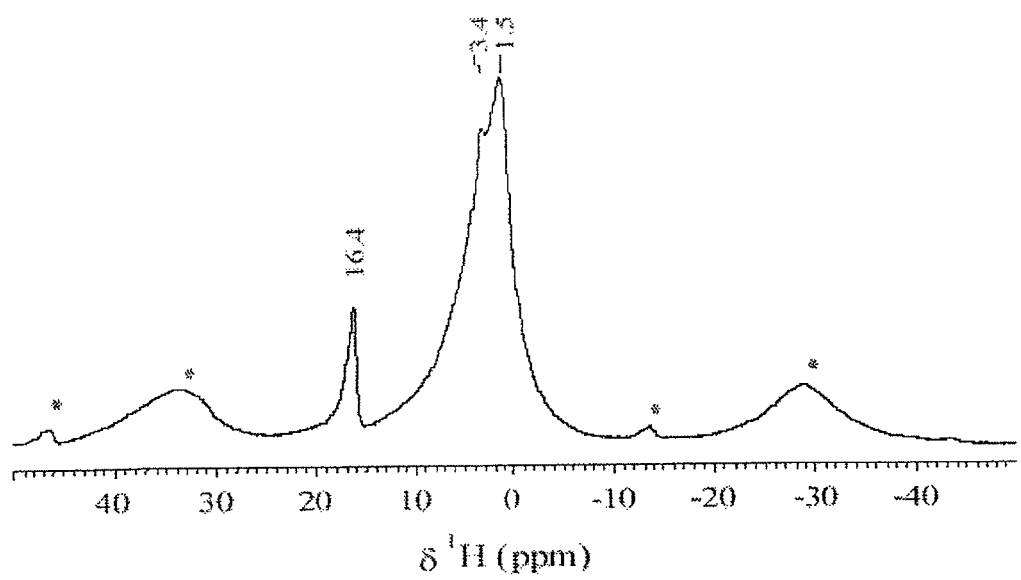
FIG. 2 shows the 1-H NMR spectrum of the dried layered silicate having the structure RUB-39 and obtained according to example 2. TMS was used as a standard. The solid-state NMR spectrum was recorded using a Bruker ASX 400 with the use of a conventional 4 mm Bruker sample head. The samples were rotated at room temperature through the magic angle at about 12 kHz spinning speed. For the quantitative spectrum, the single pulse program was used.
Figure 3:
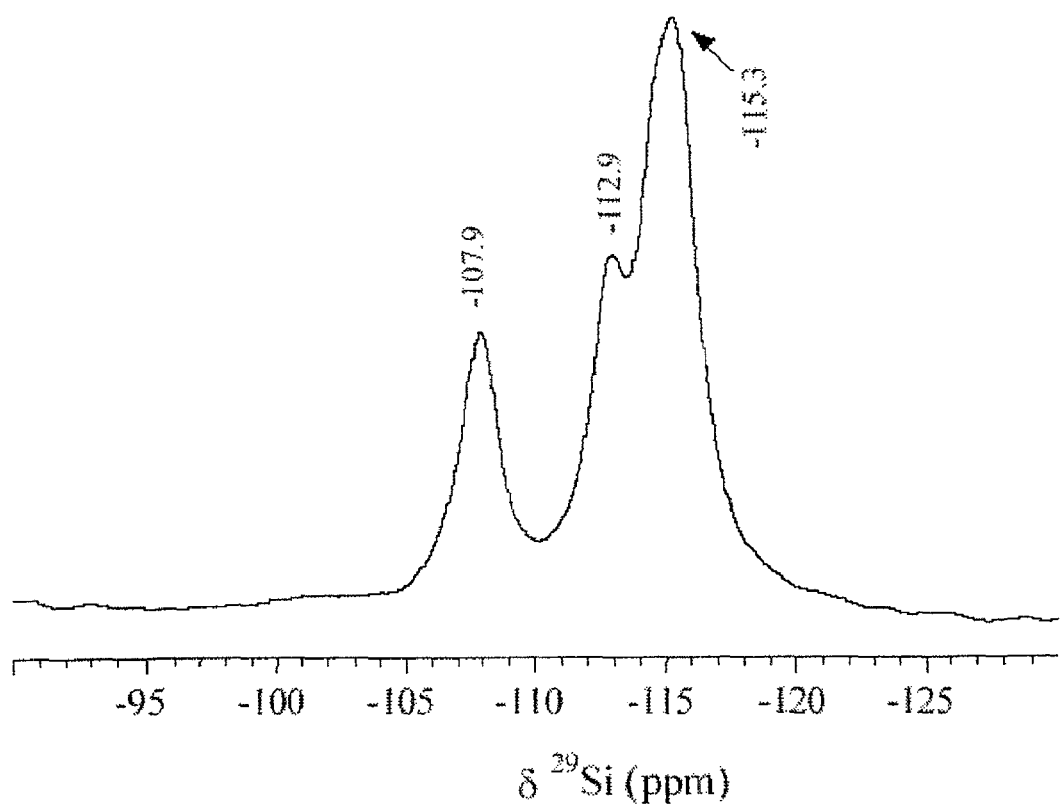
FIG. 3 shows the 29-Si MAS NMR spectrum of the calcined tectosilicate having the structure RUB-41 and obtained according to example 3. TMS was used as a standard. The solid-state NMR spectrum was recorded using a Bruker ASX 400 with the use of a conventional 7 mm Bruker sample head. The samples were rotated at room temperature through the magic angle at about 5 kHz spinning speed. For the quantitative spectrum, the HP DEC (high power decoupled) pulse program was used.
Figure 4:
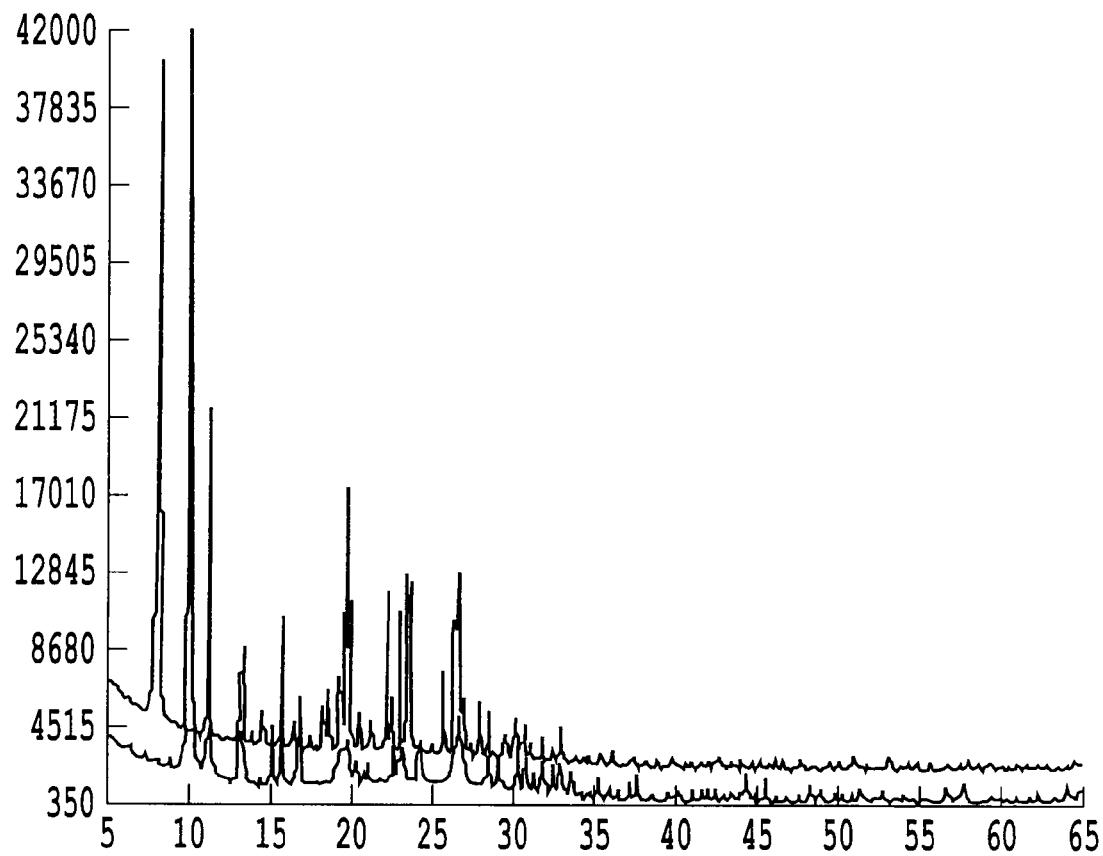
FIG. 4 shows the X-ray diffraction patterns of the dried layered silicate having the structure RUB-39 (top) obtained according to example 2 and of the calcined tectosilicate having the structure RUB-41 (bottom) and obtained according to example 3. The powder X-ray diffraction patterns were recorded on a Siemens D-5000 with monochromatic Cu K alpha-1 radiation, a capillary sample holder being used in order to avoid a preferred orientation. The diffraction data were collected using a position-sensitive detector from Braun, in the range from 8 to 96° (2 theta) and with a step width of 0.0678°. Indexing of the powder diagram was effected using the program Treor90, implemented in powder-X (Treor90 is a public domain program which is freely accessible via the URL http://www.ch.iucr.org/sincris-top/logiciel/). In the figure, the angle 2 theta in ° is shown along the abscissa and the intensities are plotted along the ordinate.
Figure 5:
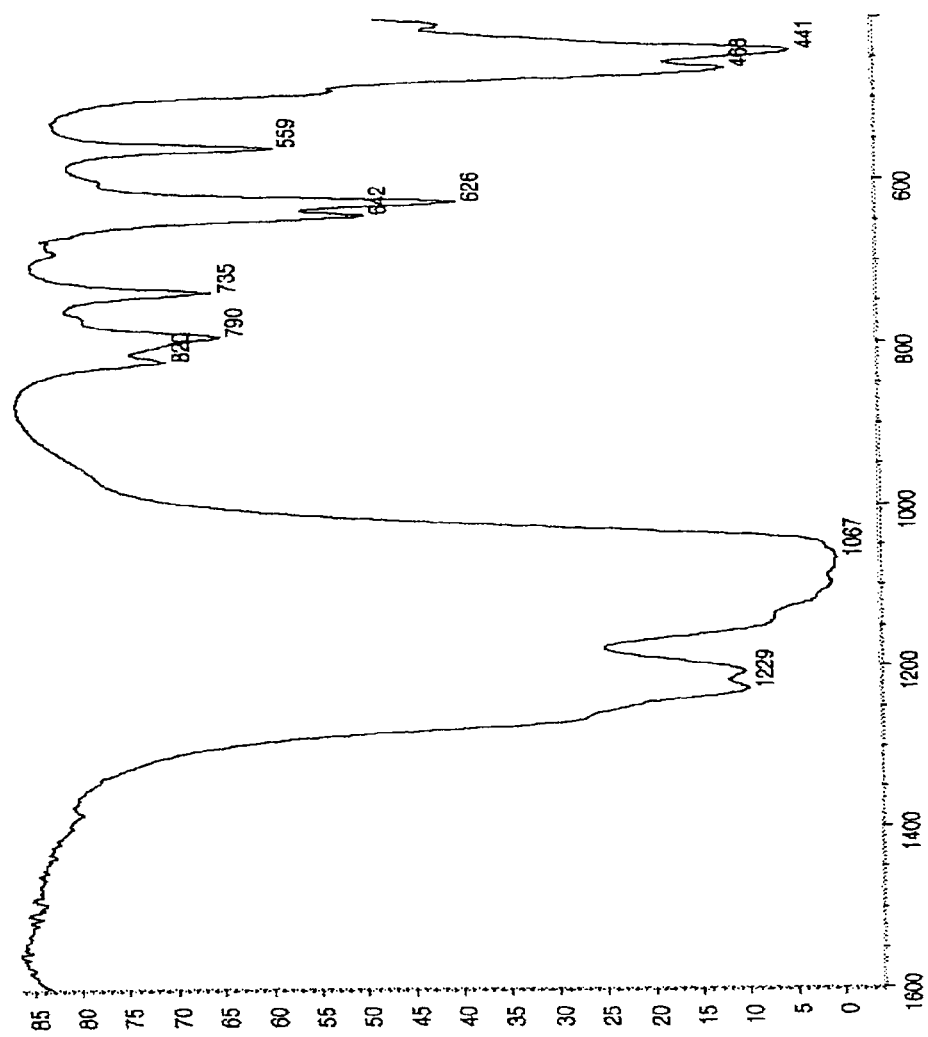
FIG. 5 shows the IR spectrum of the calcined tectosilicate having the structure RUB-41 and obtained according to example 3 in the range from 1,600 to 500 wave numbers. The wave numbers in the unit $cm^{-1}$ are shown along the abscissa and the transmission in % along the ordinate. The IR diagram was recorded using a Nicolet Magna IR-560.
Figure 6:
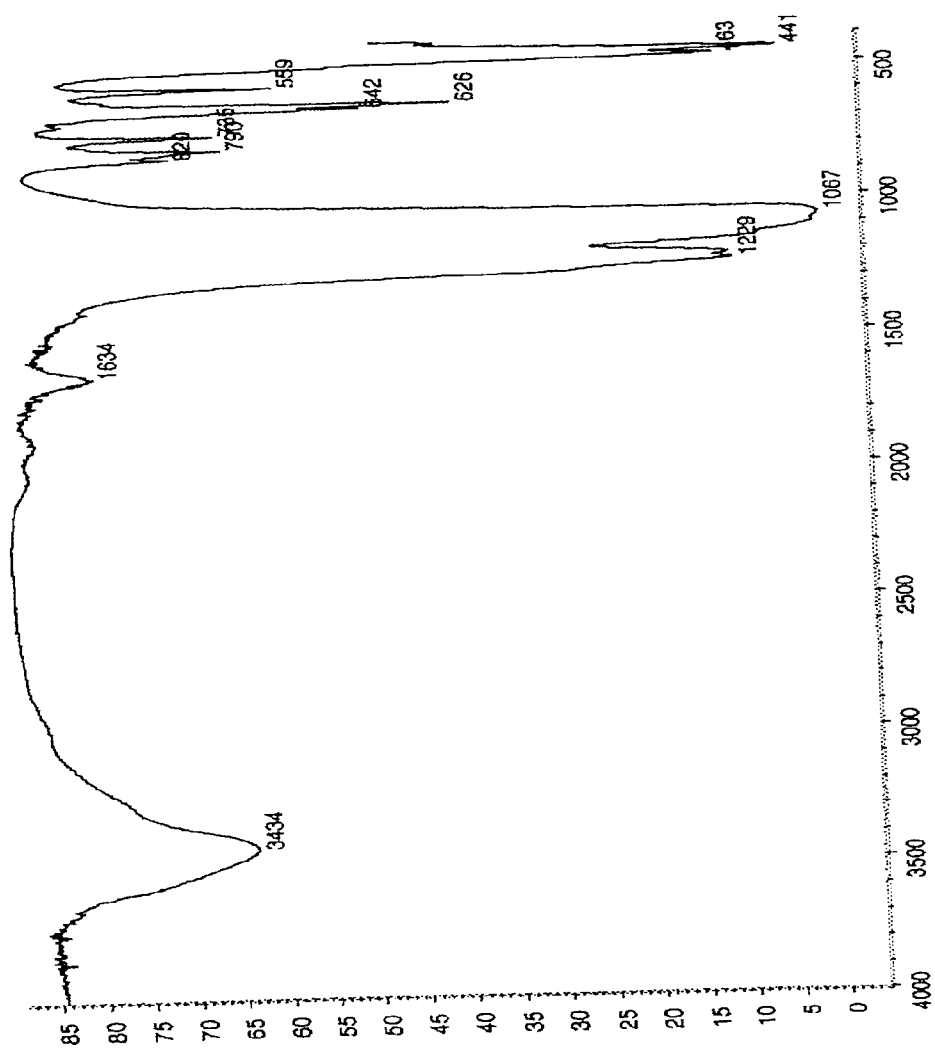
FIG. 6 shows the IR spectrum of the calcined tectosilicate having the structure RUB-41 and obtained according to example 3 in the range from 4 000 to 490 wave numbers. The wave numbers in the unit $cm^{-1}$ are shown along the abscissa and the transmittance in % along the ordinate. The IR diagram was recorded using a Nicolet Magna IR-560.

Preparation of Dimethyldipropylammonium Hydroxide 15 ml of dipropylamine in 50 ml of ethanol as a solvent and with $KHCO_3$ as a buffer are reacted with 20 ml of methyl iodide at a temperature of from 40 to 50° C. in a water bath with stirring. After 2 hours, cooling to room temperature was effected, the product dimethyldipropylammonium iodide crystallizing out. The solid filtrate was washed in ethanol. An aqueous solution of the iodide was converted over an Amberlyst anion exchanger into dimethyldipropylammonium hydroxide.

Example 2

Preparation of a Layered Silicate 3 g of amorphous silica (Aerosil®) were mixed with 50 ml of an aqueous dimethyldipropylammonium hydroxide solution having a concentration of from 0.4 to 1 mol/l and were stirred until a colloidal solution was obtained. The water content of this solution was adjusted in an oven at a temperature of 70° C. so that a mixture having the composition $SiO_2$: 0.5 dimethyldipropylammonium hydroxide: ~10 water was obtained. The mixture was then transferred to a Teflon-lined stainless steel autoclave and heated to a temperature of 150° C. at a rate of 15 r.p.m. for a period of 30 days with rotation of the autoclave. The mixture obtained thereby was then quenched with cold water, a high-viscosity suspension being obtained. The novel layered silicate was obtained therefrom by filtration, washing of the filter residue with water and drying of the filter residue at 75° C.

The synthesis product had the reflections shown in table 1 in the X-ray diffraction pattern (Cu K alpha 1).

TABLE 1

X-ray diffraction pattern of the novel layered silicate having the structure RUB-39

| 2 Theta | Intensity | I/Io |
|---|---|---|
| 8.24345 | 38624.54690 | 100 |
| 11.20594 | 6132.75830 | 16 |
| 13.39126 | 6903.00439 | 18 |
| 13.92294 | 2378.23096 | 6 |
| 14.62231 | 3522.60547 | 9 |
| 15.60788 | 2344.57275 | 6 |
| 15.73948 | 2880.48438 | 7 |
| 16.51815 | 2821.19092 | 7 |
| 17.47815 | 2041.75061 | 5 |
| 18.33579 | 3715.56616 | 10 |
| 18.57990 | 4743.49219 | 12 |
| 18.76494 | 2132.02979 | 6 |
| 20.00261 | 9294.63086 | 24 |
| 20.50116 | 3292.98145 | 9 |
| 21.21685 | 2926.98779 | 8 |
| 22.21572 | 9723.40625 | 25 |
| 22.51286 | 4358.26807 | 11 |
| 23.51819 | 10877.29880 | 28 |
| 23.66446 | 10384.66600 | 27 |

Example 3

Preparation of a Tectosilicate

The layered silicate obtained according to example 2 was calcined for a period of 12 hours at 520° C. and then for a period of 2 hours at 560° C. A tectosilicate which had the reflections shown in table 2 in the X-ray diffraction pattern (Cu K alpha 1 radiation) was obtained.

TABLE 2

X-ray diffraction pattern of the novel tectosilicate having the structure RUB-41

| 2 Theta | Intensity | I/Io |
|---|---|---|
| 10.068214 | 7238.33 | 100 |
| 11.238323 | 2074.58 | 28.8 |
| 13.142148 | 626.58 | 8.6 |
| 13.343862 | 686.61 | 9.5 |
| 15.137157 | 344.83 | 4.8 |
| 15.693608 | 977.83 | 13.5 |
| 16.611176 | 236.25 | 3.3 |
| 16.768200 | 512.23 | 7.1 |
| 19.233236 | 630.60 | 8.7 |
| 19.514395 | 1200.12 | 16.6 |
| 19.756468 | 1764.03 | 24.4 |
| 20.276875 | 117.92 | 1.6 |
| 21.006195 | 90.08 | 1.2 |
| 22.653976 | 265.87 | 3.7 |
| 23.011641 | 996.08 | 13.8 |
| 23.264645 | 267.16 | 3.7 |
| 24.154955 | 203.44 | 2.8 |
| 24.373442 | 212.81 | 2.9 |
| 26.250389 | 926.29 | 12.8 |
| 26.369091 | 966.76 | 13.2 |
| 26.547802 | 1292.96 | 17.9 |
| 26.756287 | 216.20 | 3.0 |
| 26.942410 | 486.22 | 7.1 |

Example 4

Sorption Measurements on the Tectosilicate from Example 3

(a) Measurement with Nitrogen

A pulverulent, freshly calcined sample of the tectosilicate obtained according to example 3 (about 40 mg) was weighed in and was degassed overnight at 120° C. and a reduced pressure of about $10^{-6}$ MPa. The measurement was then effected with nitrogen at 77 K on a volumetric sorption apparatus (Autosorb AS-6, from Quantachrome).

Figure 7:
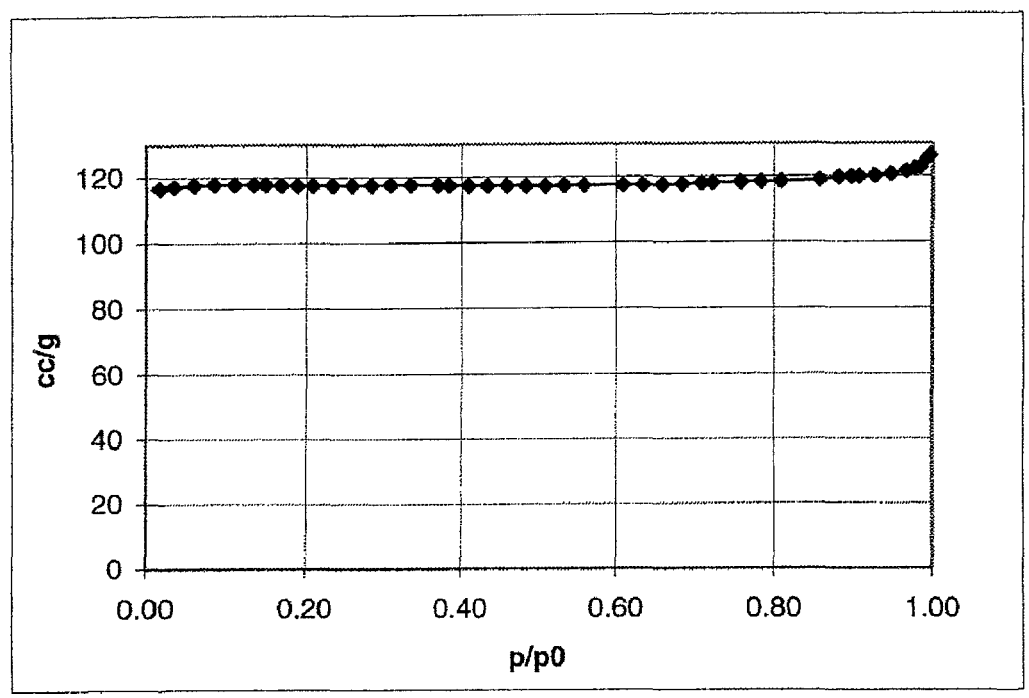
FIG. 7 shows the nitrogen adsorption isotherm according to example 4(a). The relative pressure p/p° is plotted along the abscissa and the pore volume in ml/g (STP (standard pressure and temperature)), determined according to DIN 66134 at 77 K, is plotted along the ordinate.

FIG. 7 shows the isotherm obtained. The step-like curve of a type I adsorption isotherm typical of microporous solids is evident (cf. DIN 66135). The evaluation of the data gave an equivalent surface of 510 $m^2/g$ according to the Langmuir method and a micropore volume of 0.18 ml/g according to Dubinin-Radushkevich.

(b) Measurement with N-Butane and Isobutane

A pulverulent, freshly calcined sample of the tectosilicate obtained according to example 3 (about 140 mg) was weighed in and was degassed overnight at 120° C. and a reduced pressure of about $10^{-6}$ MPa. The measurements with n-butane and isobutene, respectively (purity 99.5%) were effected gravimetrically at 296 K on a microbalance (Sartorius 4003) over the pressure range up to 800 mbar (pressure transducer from MKS Baratron).

Figure 8A:
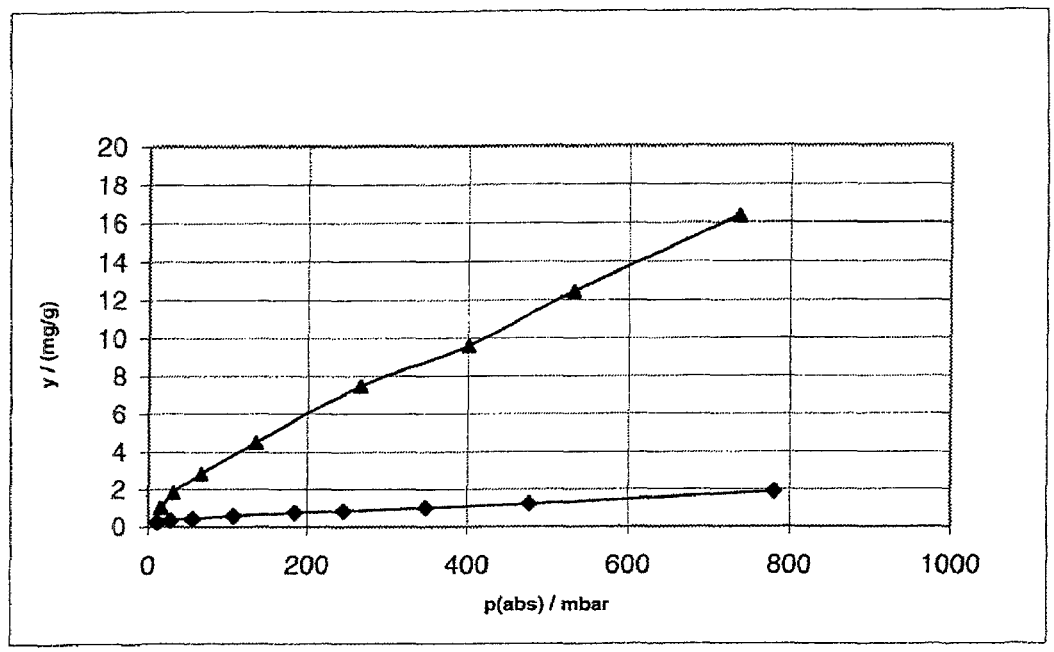
FIGS. 8a and 8b show the adsorption isotherms according to example 4(b). In each case the absolute pressure p(abs) in mbar is plotted along the abscissa and in each case the adsorbed amount of n-butane (▲) and isobutane (♦), respectively, in each case in the unit mg(hydrocarbon)/g(zeolite), is plotted along the ordinate.
Figure 8B:
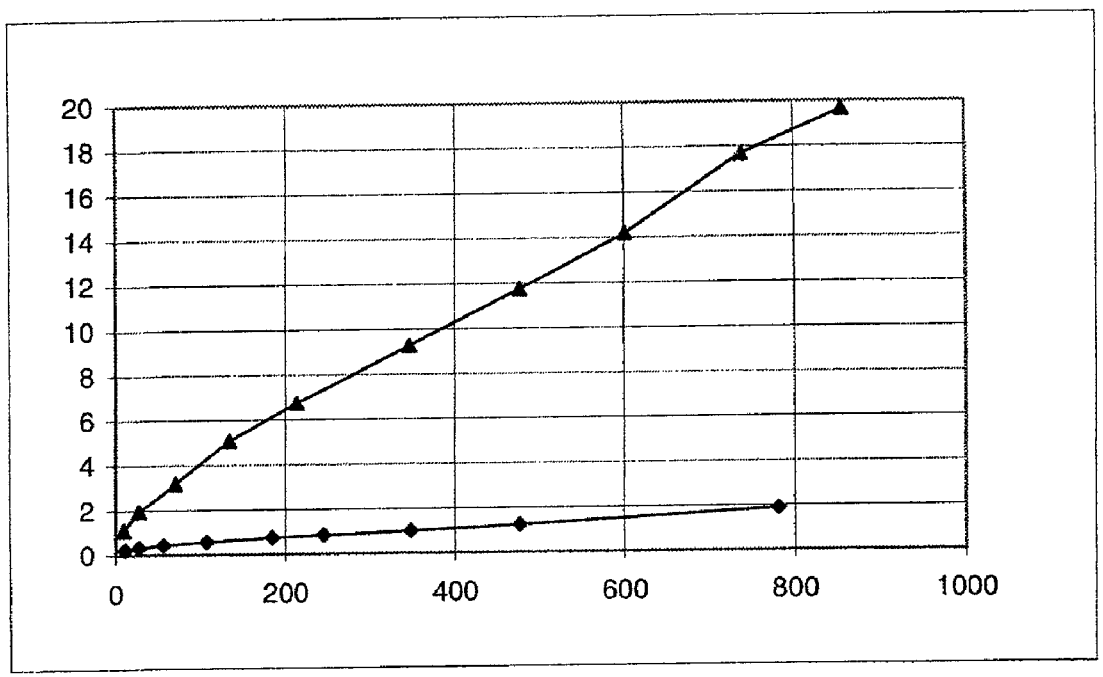

FIGS. 8a and 8b show the isotherms obtained. It is clearly evident that the slimmer molecule, n-butane, is preferentially adsorbed, whereas the more bulky isobutane is taken up only to a slight extent with a capacity of <0.2% by weight. Thus, separation of n-butane and isobutane is possible with the aid of the tectosilicate RUB-41.

(c) Measurement with Methane and Ethane

A pulverulent, freshly calcined sample of the tectosilicate obtained according to example 3 (about 140 mg) was weighed in and was degassed overnight at 120° C. and a reduced pressure of about $10^{-6}$ MPa. The measurements with methane and ethane (purity 99.5%) were effected gravimetrically at 296 K on a microbalance (Sartorius 4003) over the pressure range up to 866 mbar (pressure transducer from MKS Baratron).

Figure 9:
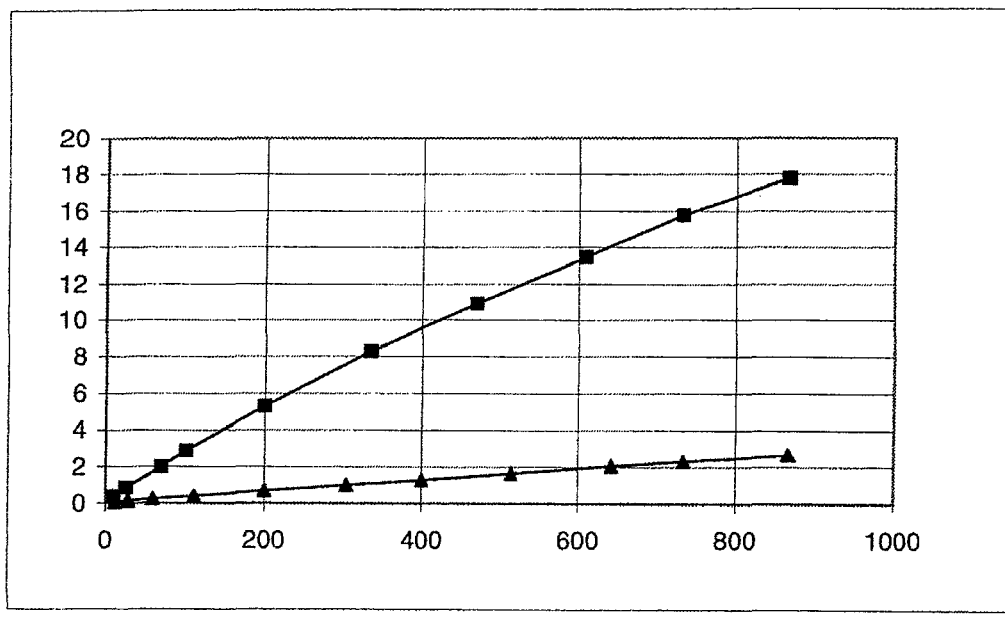
FIG. 9 shows the adsorption isotherms according to example 4(c). The absolute pressure p(abs) in mbar is plotted along the abscissa and the adsorbed amount of methane (▲) and ethane (■), respectively, in each case in the unit mg(hydrocarbon)/g(zeolite), is plotted along the ordinate.

FIG. 9 shows the isotherms obtained. It is clear therefrom that the separation of methane and ethane is possible with the aid of the tectosilicate RUB-41.

(d) Measurement with Ethene, Propene, 1-Butene and Trans-2-Butene

A pulverulent, freshly calcined sample of the tectosilicate obtained according to example 3 (about 140 mg) was weighed in and was degassed overnight at 120° C. and a reduced pressure of about $10^{-6}$ MPa. The measurements with ethene, propene, 1-butene and trans-butene (purity in each case 99.5%) were effected gravimetrically at 296 K on a microbalance (Sartorius 4003) over the pressure range up to 865 mbar (pressure transducer from MKS Baratron).

Figure 10:
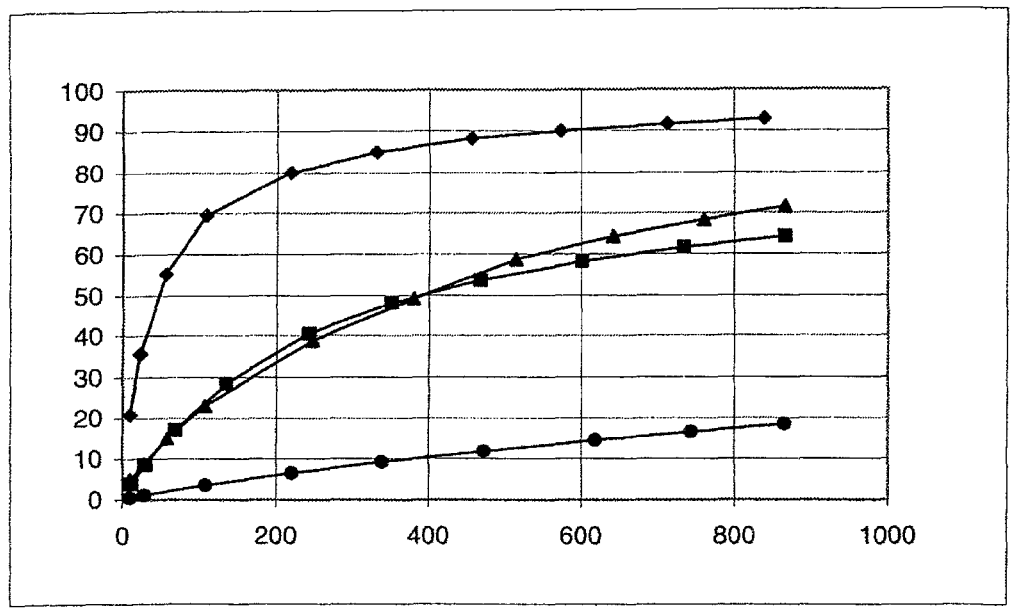
FIG. 10 shows the adsorption isotherms according to example 4(d). The absolute pressure p(abs) in mbar is plotted along the abscissa and the adsorbed amount of propene (■), ethene (●), 1-butene (▲) and trans-2-butene (♦), respectively, in each case in the unit mg(hydrocarbon)/g(zeolite), is plotted along the ordinate.
Figure 11:
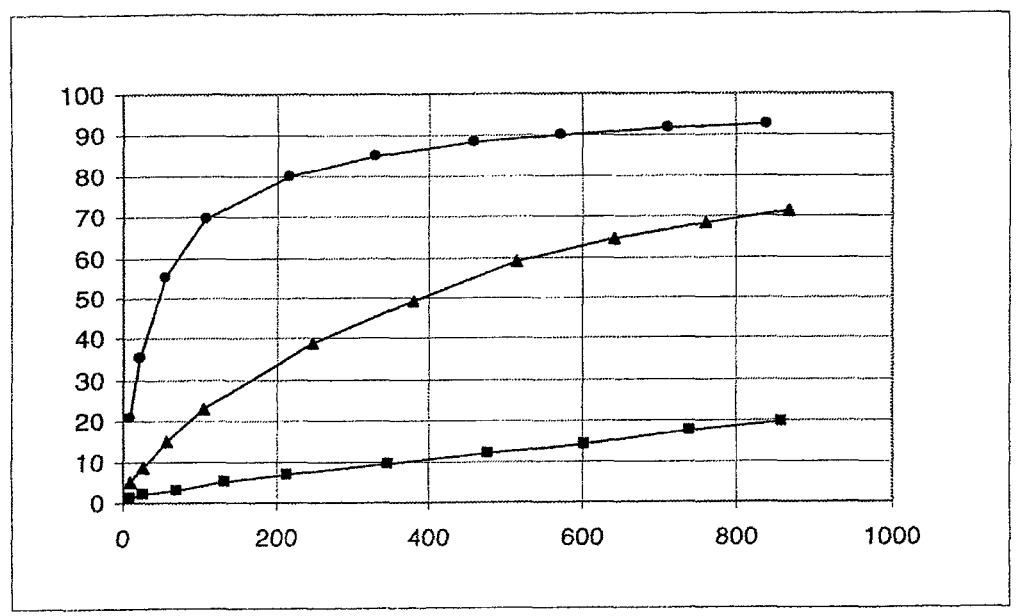
FIG. 11 shows the adsorption isotherms according to example 4(e). The absolute pressure p(abs) in mbar is plotted along the abscissa and the adsorbed amount of n-butane (■), 1-butene (▲) or trans-2-butene (●), in each case in the unit mg(hydrocarbon)/g(zeolite), is plotted along the ordinate.
Figure 12:
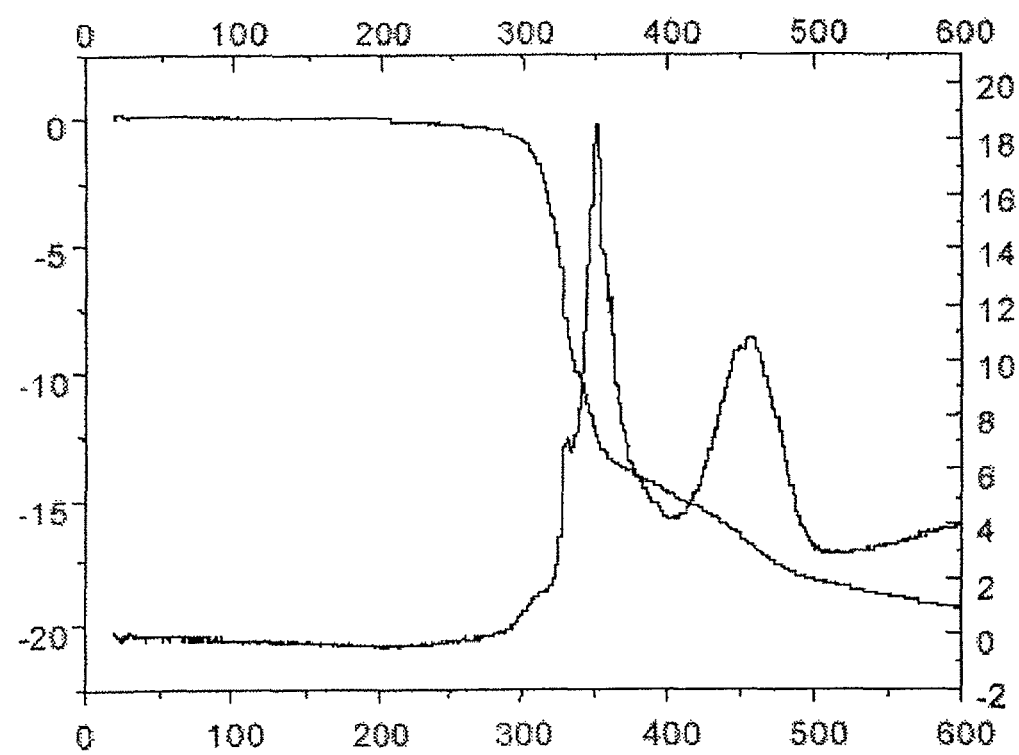
FIG. 12 shows the DTG (differential thermogravimetry) curve for the transition from the layered silicate RUB-39 from example 2 to the tectosilicate RUB-41 from example 3. The temperature in ° C. is plotted along the abscissa. The weight loss in %, based on the weight of the starting material, is shown along the left ordinate, which relates to the DTG curve. The first exothermic maximum at about 350° C. indicates the removal of the dimethyldipropylammonium hydroxide compound, and the second maximum at about 550° C. indicates the condensation to give the tectosilicate. The DTG analysis was carried out on a Bähr STA 503 at a heating rate of 10° C./h, the dried RUB-39 being heated from room temperature to 600° C. under air. The other curve in the diagram represents the DTA (differential thermal analysis) carried out simultaneously on the same apparatus.

FIG. 10 shows the isotherms obtained. It is clear therefrom that the separation of the four compounds is possible with the aid of the tectosilicate RUB-41.

(e) Measurement with N-Butane, 1-Butene and Trans-2-Butene

A pulverulent, freshly calcined sample of the tectosilicate obtained according to example 3 (about 140 mg) was weighed in and was degassed overnight at 120° C. and a reduced pressure of about $10^{-6}$ MPa. The measurements with n-butane, 1-butene and trans-2-butene (purity in each case 99.5%) were effected gravimetrically at 296 K on a microbalance (Sartorius 4003) over the pressure range up to 857 mbar (pressure transducer from MKS Baratron).

FIG. 10 shows the isotherms obtained. It is clear therefrom that the separation of the three compounds is possible with the aid of the tectosilicate RUB-41.

The invention claimed is:

1. A tectosilicate having an X-ray diffraction pattern comprising at least the following reflections:

| Intensity (%) | Diffraction angle 2θ/° [Cu K(alpha 1)] |
|---|---|
| 100 | 9.8-10.2 |
| 24-34 | 11.0-11.4 |
| 9-19 | 15.5-15.9 |
| 12-22 | 19.4-19.6 |
| 19-29 | 19.6-19.8 | wherein 100% relates to the intensity of the maximum peak in the X-ray diffraction pattern.

2. The tectosilicate as claimed in claim 1 having a thermal stability of at least 600° C.

3. The tectosilicate as claimed in claim 1, wherein the tectosilicate has 8 MR and 10 MR channels.

4. The tectosilicate as claimed in claim 3, wherein the 8 MR and 10 MR pores have a monomodal pore size distribution.

5. The tectosilicate as claimed in claim 4, wherein the pores have a specific surface in the range of from 400 to 600 m$^2$/g, determined according to DIN 66135.

6. The tectosilicate as claimed in claim 1, additionally comprising Al, B, Fe, Ti, Sn, Ge, Zr, V, Nb or two or more thereof.

7. A molding comprising at least one tectosilicate according to claim 1.

8. The tectosilicate as claimed in claim 1 having an X-ray diffraction pattern comprising at least the following reflections:

| Intensity [%] | Diffraction angle 2θ/° [Cu K (alpha 1)] |
|---|---|
| 100 | 9.8-10.2 |
| 24-34 | 11.0-11.4 |
| 9-19 | 15.5-15.9 |
| 12-22 | 19.4-19.6 |
| 19-29 | 19.6-19.8 |
| 8-18 | 26.2-<26.3 |
| 8-18 | 26.3-<26.4 |
| 13-23 | 26.4-26.6 | wherein 100% relates to the intensity of the maximum peak in the X-ray diffraction pattern.

9. The tectosilicate as claimed in claim 8 having a thermal stability of at least 600° C.

10. The tectosilicate as claimed in claim 8, wherein the tectosilicate has 8 MR and 10 MR channels.

11. The tectosilicate as claimed in claim 10, wherein the 8 MR and 10 MR pores have a monomodal pore size distribution.

12. The tectosilicate as claimed in claim 11, wherein the pores have a specific surface in the range of from 400 to 600 m$^2$/g, determined according to DIN 66135.

13. The tectosilicate as claimed in claim 8, additionally comprising Al, B, Fe, Ti, Sn, Ge, Zr, V, Nb or two or more thereof.

14. A molding comprising at least one tectosilicate according to claim 8.

* * * * *